United States Patent

Ogihara et al.

[11] Patent Number: 5,218,401
[45] Date of Patent: Jun. 8, 1993

[54] INSTANT PHOTOCOPYING APPARATUS

[75] Inventors: Masuo Ogihara; Hiroaki Ishida; Hajime Oda, all of Chiba, Japan

[73] Assignee: Seikosha Co., Ltd., Tokyo, Japan

[21] Appl. No.: 875,505

[22] Filed: Apr. 29, 1992

[30] Foreign Application Priority Data

May 30, 1991 [JP] Japan .................................. 3-127437

[51] Int. Cl.⁵ ........................ G03B 27/32; G03B 27/52
[52] U.S. Cl. ........................................ 355/27; 355/50
[58] Field of Search ..................... 355/27, 46, 50, 71, 355/1

[56] References Cited

U.S. PATENT DOCUMENTS

| | | | |
|---|---|---|---|
| 4,956,665 | 9/1990 | Niles | 355/50 |
| 4,972,224 | 11/1990 | Thompson | 355/1 |
| 4,987,441 | 1/1991 | Hudspeth | 355/50 |
| 5,164,763 | 11/1992 | Masanori et al. | 355/27 |

Primary Examiner—Richard A. Wintercorn
Attorney, Agent, or Firm—Jordan and Hamburg

[57] ABSTRACT

An instant photocopying apparatus that allows scanning of an optical means to be carried out plural times continuously by one copying starting operation in the instant photocopying apparatus for sequentially imaging and copying fine areas of an object on an instant photosensitive material by scanning the optical means in parallel to the object is provided.

A scanning number setting means 57 is provided and a control circuit 48 is programmed so that it scans continuously by the number of times set by the scanning number setting means 57. An user set any scanning number by the scanning number setting means 57. Then when a start switch SW3 is pressed, the control circuit 48 lights up an illuminating means 24 and issues a command to a motor driving circuit 54 to scan continuously by the preset number of times from one end to the other end of a copying area.

2 Claims, 4 Drawing Sheets

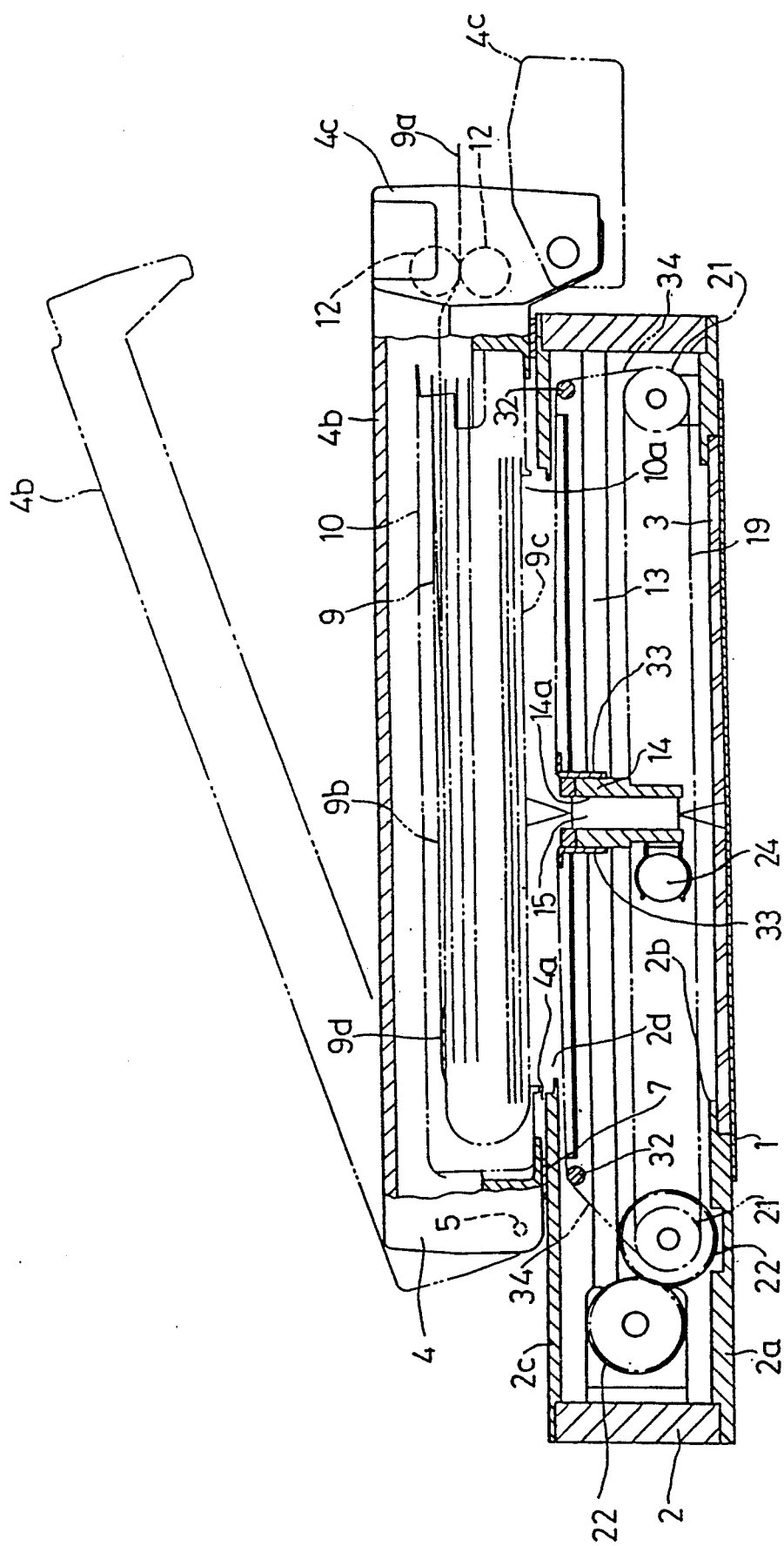

INSTANT PHOTOCOPYING APPARATUS

BACKGROUND OF THE INVENTION

1. Field of the Invention

The present invention relates to an instant photocopying apparatus for sequentially imaging fine areas of an object such as manuscripts, originals and pictures on an instant photosensitive material by scanning an optical means in parallel to the object.

2. Description of the Related Art

The applicant of the present invention has proposed an instant photocopying apparatus that allows to obtain high quality copies with a simple structure and easy operations by eliminating the complicatedness and such effects as an aberration of lens in setting close-up conditions when copying using a camera and closing-up devices and by eliminating the complexity of arrangements and the increase of load of the circuits when copying using a scanner type image reader provided with a CCD and others in Japanese Patent Application Nos. 1-331617, 1-331618 and 1-333628.

The apparatus images fine areas of an object on a photosensitive surface of an instant photosensitive material as an erecting real image and forms a reverse image of the image imaged on the photosensitive surface as a visible image on a printing surface of the instant photosensitive material while causing the photosensitive surface of the instant photosensitive material to face in parallel to the object, disposing an optical means between them, moving the optical means in parallel to the object and illuminating the object by an illuminating means.

When a start switch is pressed, the optical means is moved from one end to the other end of the copying area to perform one copying. That is, when the start switch is pressed one time, one exposure is carried out and thereby one copying is carried out.

Accordingly, if copying has to be carried out brightly more than the original for example, several times of exposures have to be carried and the start switch has to be pressed several times.

Moreover, since brightness of the illuminating means, e.g. a fluorescent lamp, is lowered when its temperature drops, exposure has to be carried out several times and the start switch has to be pressed several times when copying in low temperature.

Furthermore, exposure has to be carried out several times and the start switch has to be pressed several times when an instant photosensitive material having lower sensitivity than a specified value is used.

As described above, the instant photocopying apparatus had such a disadvantage that when many copies of the same object need to be taken or when there are many objects to be copied, the number of copies to be taken is increased in a great deal and the copying operation becomes very complicated.

SUMMARY OF THE INVENTION

Accordingly, it is an object of the present invention to overcome the aforementioned disadvantage by providing an instant photocopying apparatus that allows an optical means to scan continuously plural times by one time of copy starting operation and thereby to obtain any exposure.

In order to attain the aforementioned object, the instant photocopying apparatus of the present invention is comprised of an illuminating means for illuminating an object, an optical means for imaging fine areas of the object on a photosensitive surface of an instant photosensitive material, a driving means for scanning the optical means in parallel to the object, a scanning number setting means for setting scanning number of the optical means, a control means for controlling the driving means so that the optical means is scanned continuously by a number of times preset by the scanning number setting means.

Preferably, the illuminating means is provided so that its brightness may be changed and the driving means is provided so that the scanning speed of the optical means may be changed to be able to change exposure conditions of the instant photosensitive material each time when the optical means is scanned.

The above and other advantages of the invention will become more apparent in the following description and the accompanying drawings.

BRIEF DESCRIPTION OF THE DRAWINGS

FIG. 4 is a longitudinal section view of an instant photocopying apparatus of the present invention.

In the foregoing drawings, like reference numerals designate like or corresponding parts throughout several views.

DETAILED DESCRIPTION OF PREFERRED EMBODIMENT

Figure 1:
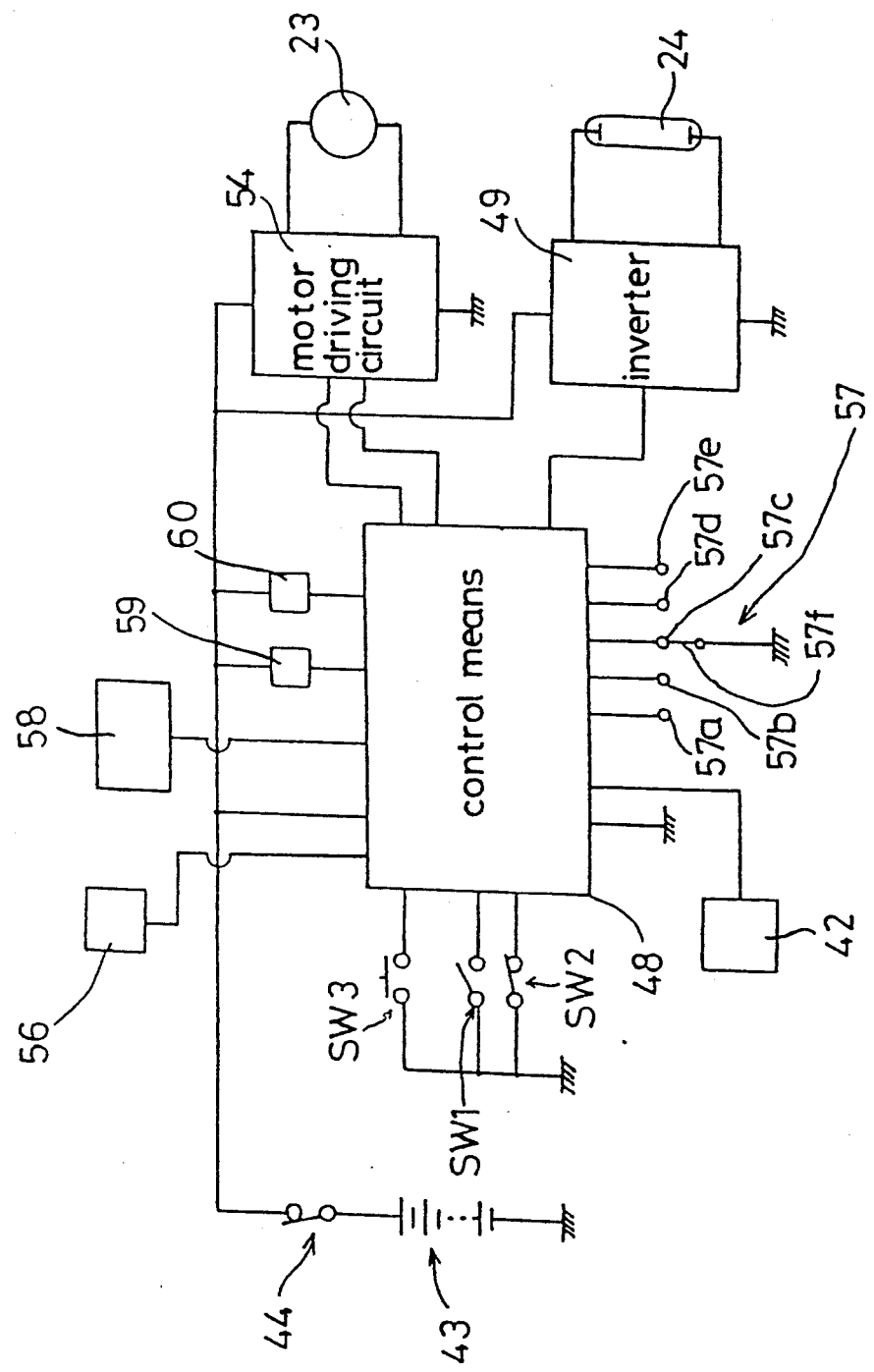
FIG. 1 is a block diagram showing a first preferred embodiment of the present invention.

Referring now to the drawings, preferred embodiments of the present invention will be explained.

At first, an instant photocopying apparatus will be explained referring to FIG. 4.

A window 2 that allows to see through an manuscript 1, i.e. an object, is formed on a base plate 2a of a case 2 which is placed on the manuscript 1 and a transparent plate 3 is secured to the window 2b so that their bottom surfaces are formed into one surface. An opening 2d is formed on an upper plate 2c in a position relationship facing to the window 2b on the base plate 2a.

A window 4a is provided on a cassette holder 4 at the bottom surface thereof and the cassette holder 4 is secured to the case 2 through the intermediary of a spacer 7 so that the window 4a and the opening 2d face each other. Provided on the cassette holder 4 is an upper cover 4b, turnably supported around a shaft 5 at the left end portion of the cassette holder 4, for inserting and taking out a cassette 10. A lock arm 4c for locking the upper cover 4b in a closed condition is mounted to the right end portion of the cassette holder 4.

Mounted in the cassette holder 4 is the cassette 10 in which a plurality of peeling type instant films 9 as instant photosensitive materials are stored. The rear end portion of a tongue member for pulling out 9a of the instant film 9 is forked into two branches. A printing film (printing surface) 9a and a photosensitive film (photosensitive surface) 9c are secured to each end of the branch facing each other and developer 9d which is contained in a package is attached to the other end of the branches. The instant films 9 are folded within the cassette 10. A photosensitive film 9c at the bottom of them is exposed from a window 10a opened on the bottom surface of the cassette 10 and faces to the window 2b in parallel to the base plate 2a in a state when the cassette 10 is set to the cassette holder 4. By pulling out the tongue member for pulling out 9a through between a pair of rollers 12 mounted to the cassette holder 4, the package in which the developer 9d is contained is broken and the developer is applied between the printing surface 9b and the photosensitive film 9c, thereby developing and fixing the instant film 9.

A pair of guide shafts 13 are provided at both side portions in the case 2 in the direction vertical to the drawing sheet in parallel to the bottom surface of the case 2 and penetrate a pair of guide holes (not shown) provided at both end portions of a carrier 14. Accordingly, the carrier 14 can be moved in parallel to the manuscript 1 by being guided by the guide shafts 13.

An elongated groove 14a is formed in the middle portion of the carrier 14 and a rod lens array 15 as an optical means is held within the elongated groove 14a. The rod lens array 15 may be for example Selfoc lens array (trade name). The rod lens array 15 images thin band-shaped areas of the manuscript 1 that is contacting with the bottom surface of the transparent plate 3 on the photosensitive film 9c as an erecting image having equal magnitude.

Secured on one end portion of the carrier 14 is a part of an endless timing belt 19 which is wound up by a pulley 21 pivoted by the case 2. The pulley 21 rotates by interlocking with rotation of a driving motor 23 (shown in FIGS. 1, 2 and 3) as a driving means through the intermediary of a gear train 22. Accordingly, the carrier 14 may be reciprocated by rotating the driving motor 23 forwardly and reversely. Limit switches SW1 and SW2 (shown in FIGS. 1, 2 and 3) for limiting the moving range of the carrier 14 is provided respectively at the left and right portions in FIG. 4 within the case 2.

A fluorescent lamp 24 as an illuminating means is mounted to the carrier 14. Fixed to the circumference of the fluorescent lamp 24 is a mask (not shown) in which a slit-shape aperture is opened at a position facing to the manuscript surface below the rod lens array 15 to increase illumination of the fine areas of the manuscript 1 to be copied.

Shading film winding parts (not shown) connected coaxially and through the intermediary of coil springs (not shown) with the pulley 21 are formed at two points in the right and left sides in FIG. 4. One end of the pair of shading films 34 is secured to an angle 33 provided for attaching the shading films 34 to the carrier 14 and the other ends are secured to the shading film winding parts through the intermediary of a pair of shading film guides 32. When the pulley 21 is rotated to move the carrier 14, the shading film winding parts are rotated through the intermediary of the coil springs and thereby without any deflection, one end of the shading film 34 is wound out and the other end is wound up. The pair of shading films 34 prevent the photosensitive film 9c of the instant film 9 from being sensitized by light not passed through the rod lens array 15. When the carrier 14 is in stand-by state positioning at the left or right side portion in FIG. 4, a projecting portion of the rod lens array 15 is out of the opening 2d, so that the photosensitive film 9c is prevented from being sensitized.

Referring next to a block diagram in FIG. 1, a first embodiment of the present invention will be explained.

Within the case 2, a power source 43 of the apparatus is disposed at a certain position. The power source 43 is connected to a motor driving circuit 54 and an inverter 49 through the intermediary of a power switch 44, provided on the surface of the case 2, for turning ON and OFF the power source 43. Informations on whether the power switch 44 is ON or OFF and on remaining electric energy of the power source 43 are transmitted to a control circuit 48 as a control means. A motor driving circuit 54 and the inverter 49 are connected to the control circuit 48 and the driving of the motor 23 and lighting of the fluorescent lamp 24 are controlled respectively by the control circuit 48.

Beside the limit switches SW1 and SW2, a start switch SW3, provided on the surface of the case 2, for causing the carrier 14 to move is connected to the control circuit 48.

Provided at a predetermined position within the case 2 is a temperature detecting means 42 comprised of a thermister and others for detecting outside temperature and connected to the control circuit 48. The control circuit 48 causes temperature detected by the temperature detecting means 42 to be indicated by a temperature indicating device 56. A scanning number setting means 57 is provided on the surface of the case 2 and is connected to the control circuit 48. The scanning number setting means 57 is a five-stage turning switch for example like a rotary switch or a sliding switch and one to five scanning numbers may be specified by adjusting an indicator 57f to anyone of scales 57a through 57e. The control circuit 48 is programmed to continuously scan by a number of times set by the scanning number setting means 57.

A scanning number indicating device 58 is provided also on the surface of the case 2 and is connected to the control circuit 48. The scanning number indicating device 58 indicates "0" before the start switch SW3 is pressed and indicates remaining scanning numbers after the start switch is pressed.

A battery check indicating device 59 is also provided on the surface of the case 2 and is connected to the control circuit 48. Based on the information on remaining electrical energy of the power source 43, the control circuit 48 indicates in the battery check indicating device 59 whether the electrical energy of the power source 43 is sufficient or not. A start indicating device 60 is also provided on the surface of the case 2 and is connected to the control circuit 48. After when the start switch SW3 is pressed and the carrier 14 starts, the control circuit 48 causes the start indicating device 60 to indicate during the movement of the carrier 14.

In operation, consider that the carrier 14 is at the stand-by position in the left side in FIG. 4 and that the limit switch SW1 is pressed.

When the power switch 44 is turned on in this state while placing the present apparatus on the manuscript 1, temperature detected by the temperature detecting means 42 is indicated in the temperature indicating device 56. Then seeing the indication, an user is going to scan two times when the temperature is below 15° C. for example and three times when it is below 5° C. So the indicator 57f is moved to the position of the scale of that number by the scanning number setting means 57.

Then the user presses the start switch SW3, and the control circuit 48 checks the battery and issues an command to the inverter 49 to light up the fluorescent lamp 24 preliminary to stabilize its brightness and then to light up the fluorescent lamp 24. The scanning number indicating device 58 indicates the scanning number which has been specified by the user. That is, in the case of FIG. 1, since the indicator 57f is specifying the scale 57c, numeral "3" is indicated in the scanning number indicating device 58.

Then the control circuit 48 issues a command to the motor driving circuit 54 to drive the motor 23 to move the carrier 14 from the left stand-by position to the right stand-by position. During that time, the fine areas of the manuscript 1 are imaged sequentially on the photosensitive film 9c of the instant film 9 through the rod lens array 15.

When the limit switch SW2 is pressed when the carrier 14 has reached to the right stand-by position, one scanning is finished and the control circuit 48 changes the indication of the scanning number indicating device 58 to numeral "2" and issues a command to the motor driving circuit 54 to change the rotation of the motor 23 in the reverse direction to move the carrier 14 successively from the right stand-by position to the left stand-by position. Since such sequences as checking the battery and lighting up the fluorescent lamp 24 preliminarily have been carried out when the first scanning was started, they are not carried out from the second scanning.

When the limit switch SW1 is pressed when the carrier 14 has reached to the left stand-by position, the second scanning is finished and the control circuit 48 changes the indication of the scanning number indicating device 58 to numeral "1" and issues a command to the motor driving circuit 54 to change the rotation of the motor 23 in the reverse direction to successively move the carrier 14 from the left stand-by position to the right stand-by position.

When the limit switch SW1 is pressed when the carrier 14 has reached to the right stand-by position, the third scanning is finished and the control circuit 48 changes the indication of the scanning number indicating device 58 to numeral "0" and issues a command to the motor driving circuit 54 to stop the rotation of the motor 23 to stop the optical means 15 at the right stand-by position and to turn off the fluorescent lamp 24.

After that, the tongue member for pulling out 9a of the instant film 9 is pulled out to apply the developer 9d between the printing surface 9b and the photosensitive film 9c to adhere the both and the development is completed in about 1 minute for example.

When it is desired to copy the same manuscript again, the start switch SW3 is pressed again. Then after checking the battery and lighting up the fluorescent lamp 24 preliminarily by the same sequence as described above, the control circuit 48 carries out three times of scanning continuously starting from the right stand-by position this time.

When the copying is finished, the power switch 44 is turned OFF.

According to the aforementioned embodiment, the manuscript 1 may be copied brighter than itself by arbitrarily setting the scanning number.

It may be also appropriate to change the speed of the motor 23 and the brightness of the fluorescent lamp 24 per each scanning. That is, the brightness of the fluorescent lamp 24 and the speed of the motor 23 are arranged to be changed by the control of the control circuit 48. Then if there are 5 stages of scales, the scale in each stage is set to be able to obtain an exposure which is 0.5 times, 1 time, 1.5 times, 2 times and 3 times of the exposure obtained by one scanning under the current condition. 0.5 times to 2 times of the exposure are obtained by one time of scanning and only by adjusting the speed of the motor and the brightness of the fluorescent lamp 24 and 3 times of exposure is obtained by scanning three times. By arranging like this, the exposure may be corrected more finely.

Figure 2:
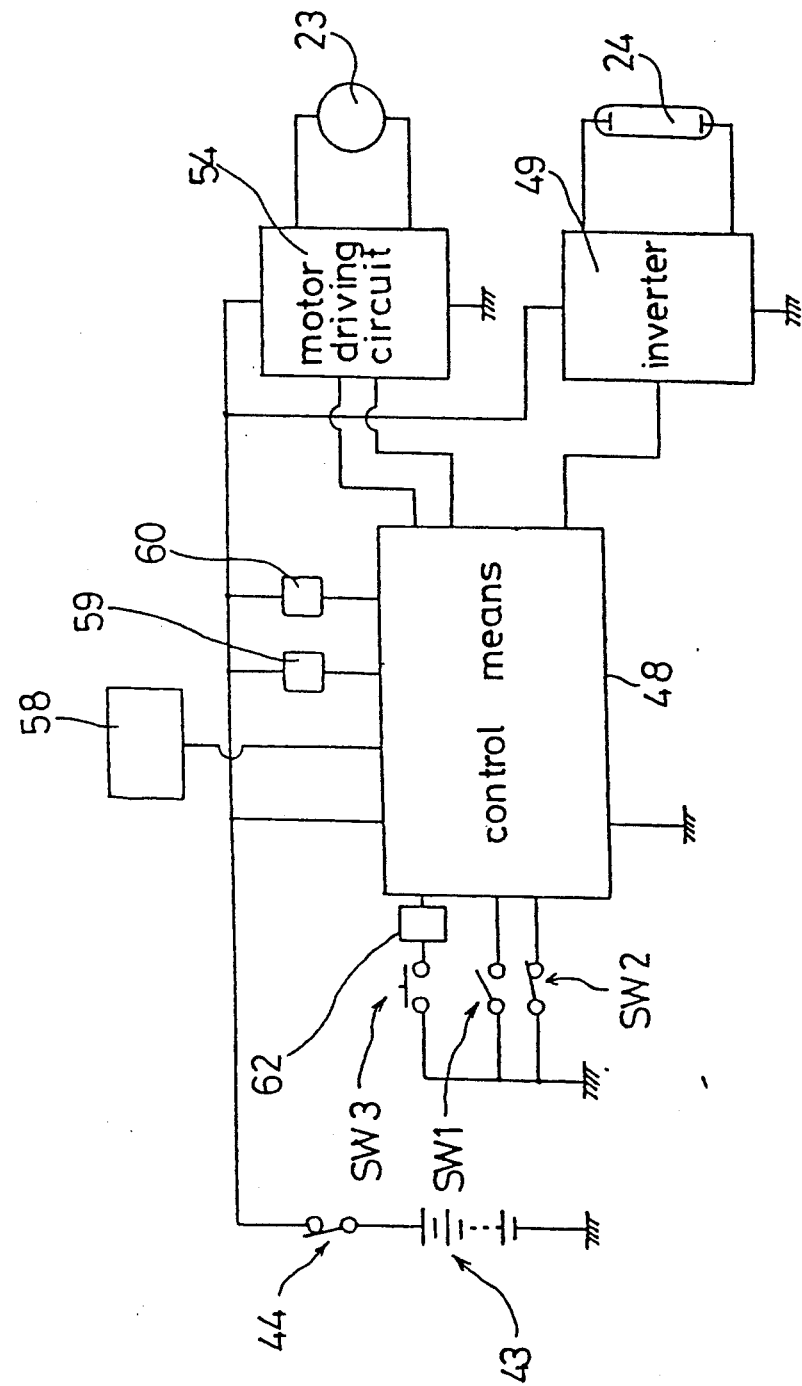
FIG. 2 is a block diagram showing a second preferred embodiment of the present invention.

Referring now to FIG. 2, a second embodiment of the present invention will be explained.

Like reference numerals or names designate the like parts in FIG. 1.

A pressing state determining means 62 is provided between the start switch SW3 and the control circuit 48. The pressing state determining means 62 determines how many times the start switch SW3 has been repetitively pressed and transmits the result to the control circuit 48. The pressed number is set as a scanning number.

When the user presses the power switch 44 and presses the start switch SW3 several times in accordance to a desired scanning number, the pressing state determining means 62 determines the pressed numbers and transmits it to the control circuit 48, and the control circuit 48 transmits the number to the scanning number indicating device 58 to indicate the number. Then the control circuit 48 checks the battery, issues a command to the inverter 49 to light up the fluorescent lamp 24 preliminarily to stabilize its brightness and then to light the fluorescent lamp 24 and drives the motor 23 to cause the carrier 14 to scan continuously by the preset number of times to carry out the copying.

Since the present embodiment is constructed as described above, the scanning number setting means and others need not be provided beside above, thereby allowing to save the space and to lower the cost.

Although the pressing state determining means 62 has been caused to determine the pressed numbers of the start switch SW3, it is possible to cause the pressing state determining means 62 to determine a pressed time of the start switch SW3 and to cause the control circuit 48 to advance the number indicated by the scanning number indicating device 58 gradually while the switch is pressed. While watching the indication, the user stops pressing the start switch SW3 when a desired number shows up to set a desired scanning number.

Figure 3:
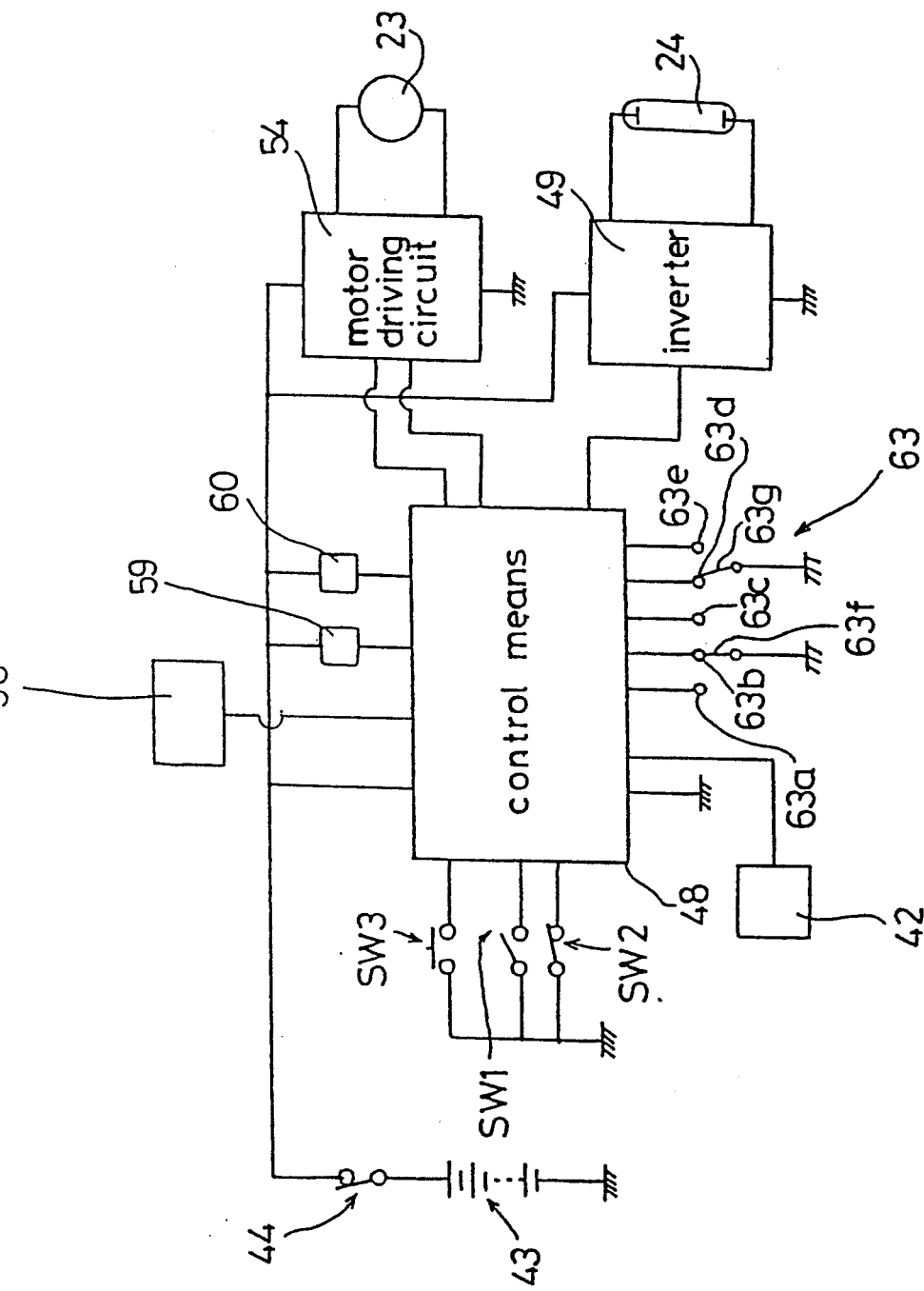
FIG. 3 is a block diagram showing a third preferred embodiment of the present invention.

Referring now to FIG. 3, a third embodiment of the present invention will be explained.

Like reference numerals or names designated the like parts in FIG. 1.

A scanning number setting means 63 is arranged so that scales 63a, 63b and 63c and scales 63d and 63e have different meaning. The scales 63a, 63b and 63c indicate 0 time, 1 time and 2 times of scanning number respectively under the scanning condition intact and anyone of them is specified by an indicator 63f. The scales 63d and 63e indicate one time of scanning under 0.5 times of exposure and no scanning under 0.5 times of exposure, respectively and either one of them is specified by an indicator 63g. Scanning is carried out by number of times specified by the scales 63a, 63b and 63c at first and then scanning under the conditions specified by the scales 63d and 63e is carried out. For example, under the specification in FIG. 3, it is specified that one scanning be carried out under the exposure intact and then one scanning be carried out under half exposure. Since the control circuit 48 is arranged to change the brightness of the fluorescent lamp 24 and the speed of the motor 23, the brightness is reduced by about 30 percent or the speed of the motor 23 is increased two times to reduce the exposure into half. When the start switch SW3 is pressed after specifying like that, the control circuit 48 scans under the condition intact in the first scanning and scans changing the brightness of the fluorescent lamp 24 and the speed of the motor 23 in the second scanning as described above.

In order to obtain more fine exposure, a scanning condition setting means may be provided beside the scanning number setting means to set scanning conditions per each scanning number after setting the scanning number. In that case, it is appropriate to indicate the exposure in each scanning number during when the remaining scanning number is indicated by the scanning number indicating device 58. By arranging like that, the brightness of the illuminating means and the speed of the optical means 15 may be changed per each scanning number, so that more fine exposure may be obtained.

Furthermore, it is appropriate to indicate that exposure conditions have been changed from normal (standard) conditions when they have changed. Moreover, the temperature detecting means 42 may be a scanning number setting means as it is without providing an scanning number setting means comprised of switches in FIGS. 1 and 3. That is, it is possible to scan continuously by scanning numbers determined corresponding to temperature.

Since the present invention is constructed as described above, it is possible to scan the optical means by any number of times by one copying starting operation.

As many apparently widely different embodiments of this invention may be made without departing from the spirit and scope thereof, it is to be understood that the invention is not limited to the specific embodiments thereof except as defined in the appended claims.

What is claimed is:

1. An instant photocopying apparatus, comprising:
   illuminating means for illuminating an object;
   optical means for imaging fine areas of said object on a photosensitive surface of an instant photosensitive material;
   driving means for scanning said optical means in parallel to said object;
   scanning number setting means for setting scanning number of said optical means;
   control means for controlling said driving means so that said optical means is scanned continuously by a number of times preset by said scanning number setting means.

2. An instant photocopying apparatus according to claim 1, wherein said illuminating means is arranged so that its brightness may be changed and said driving means is arranged so that it can change scanning speed of said optical means to be able to change exposure conditions of said instant photosensitive material per each one scanning of said optical means.

* * * * *